March 24, 1959 V. CIMBALI 2,878,747
AUTOMATIC DISTRIBUTING SET FOR COFFEE PERCOLATORS
Filed Sept. 7, 1956 2 Sheets-Sheet 1
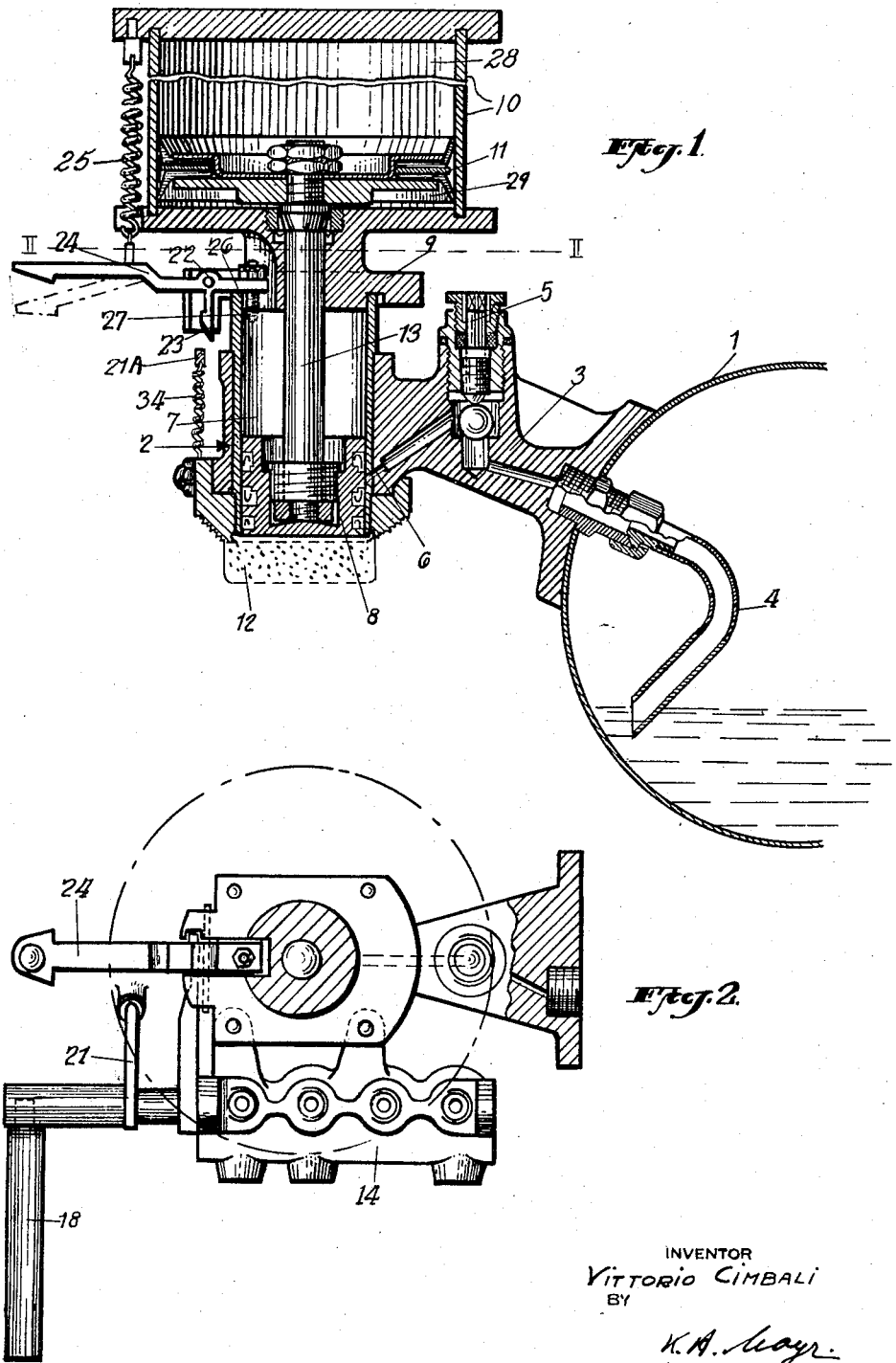
INVENTOR
VITTORIO CIMBALI
BY
K.H. Mayr
ATTORNEY INVENTOR
VITTORIO CIMBALI
BY
K. H. Mayr
ATTORNEY

United States Patent Office 2,878,747
Patented Mar. 24, 1959

2,878,747

AUTOMATIC DISTRIBUTING SET FOR COFFEE PERCOLATORS

Vittorio Cimbali, Milan, Italy, assignor to Officine Cimbali Giuseppe-S. p. A.

Application September 7, 1956, Serial No. 608,630

Claims priority, application Italy April 7, 1956

7 Claims. (Cl. 99—302)

The present invention relates to a coffee percolator attached to and receiving hot water from a boiler.

In coffee percolators, in which the distributing sets are operated by hand, the problem to prevent overheating has not yet been solved, when the drink preparations are following each other at a qiuck or very quick rhythm.

The matter has become, for obvious reasons, more serious in the automatic distributing sets and in the semi-automatic or automatic coffee percolators which are having at present an extensive market.

Several proposals have been made for preventing undesired overheating, inter alia, the following: Whenever coffee is prepared the hot water, intended for the infusion, is mixed with a dosed quantity of cold water; to lap, in the same circumstances, the walls of the set with cold water; to run the hot water, before its introduction into the infusion chamber, through a heat exchanger.

All the proposals presented up to now have not produced the desired result.

The problem for which a solution is provided by the invention is defined in the following.

The set, with hot water, is connected, materially and therefore thermically, with the source of hot water.

After the source of hot water has attained the desired temperature, for example $T°$, which is constant, the set will assume, after a certain period of time, a constant temperature $t°$ (less than $T°$).

When coffee is made, a certain quantity of water is passed from the source of hot water at the temperature $T°$ to the infusion chamber, where, after transferring part of its heat to the set whose temperature was at the lower temperature $t°$, the water will assume an average temperature $Z°$ which may be the optimum temperature for making the coffee.

During this time the temperature of the set has risen from the temperature $t°$ to $(t+x)°$.

If coffee is made $n$ times within a certain period of time, the temperature of the set will rise during this period from $t°$ to $(t+nx)°$, i. e., the set will be overheated and the coffee will have a "burnt" taste.

Conventional apparatuses either do not solve the problem because it was not properly recognized by the prior inventors, or are complicated and do not provide the technical progress which is desired.

It is an object of the present invention to provide a system for definitely controlling the temperature of a coffee percolating apparatus which receives hot water from a boiler. The device according to the invention assures that the temperature of the water with which the infusions are made does not rise above the optimum temperature for making coffee, no matter how short the time intervals are between making consecutive infusions.

The novel features which are considered characteristic of the invention are set forth with particularity in the appended claims. The invention itself, however, and additional objects and advantages thereof will best be understood from the following description of an embodiment thereof when read in connection with the accompanying drawing in which:

Fig. 1 is a sectional view of an apparatus according to the invention.

Fig. 2 is a sectional top view of the infusion device forming part of the apparatus shown in Fig. 1, the section being made along line II—II in Fig. 1.

Figure 4:
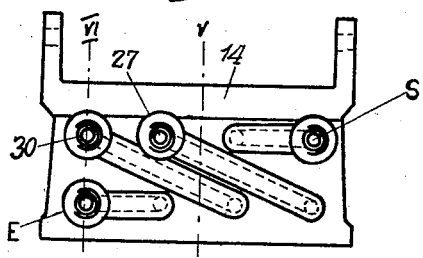
Fig. 4 is a side view of a hydraulic control unit forming part of the apparatus according to the invention.
Figure 6:
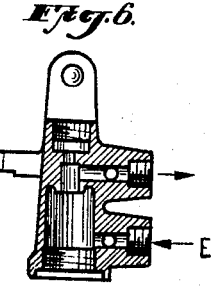
Fig. 6 is a sectional view of the unit shown in Fig. 4, the section being made on line VI—VI of said figure.
Figure 7:
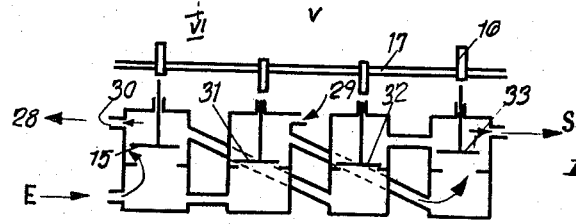
Figure 8:
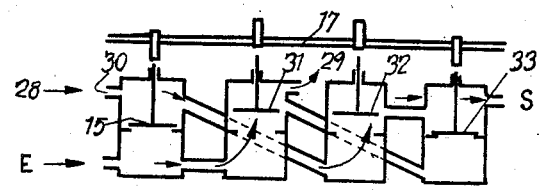

Figs. 7 and 8 schematically illustrate a set of valves forming part of the distributor unit shown in Fig. 4, in two different positions.

Like parts are designated by like numerals in all figures of the drawing.

Referring more particularly to the drawing, a coffee percolator set 2 is connected to a boiler 1 by means of a bracket 3.

Hot water drawn from the boiler 1 passes through an inlet 4 in the water chamber of the boiler, a check valve, not shown, and a duct in the bracket 3 and controlled by a check valve 5, which can be adjusted from outside, into a cylinder 7 when a port 6 is uncovered by a piston 8, to penetrate into an infusion chamber 12. The apparatus is so designed that, when the boiler is in working condition, the temperature of the set is $t°$ and is constant so that the hot water arriving from the boiler may assume in the infusion chamber 12 the temperature $Z°$ required to make the coffee.

A cylinder 10 is mounted on a cover 9 of the cylinder 7 and is in metallic contact therewith. A piston 11 reciprocates in the cylinder 10 and is connected with the piston 8 reciprocating in the cylinder 7 through a rod 13.

A hydraulic control unit 14 includes four valves 15, 31, 32, 33 whose stems abut against and are controlled by cams 16 on a cam shaft 17, provided with a hand lever 18 and with an arm 19, adapted to cooperate with a catch or abutment 20 under the action of a spring 34 which is connected with a stationary part of the percolator and with the free end of an arm 21 made fast on the shaft 17.

The lever 18 and the arm 21 are shown in one extreme position marked on the drawing 18B and 21B, respectively.

Figure 3:
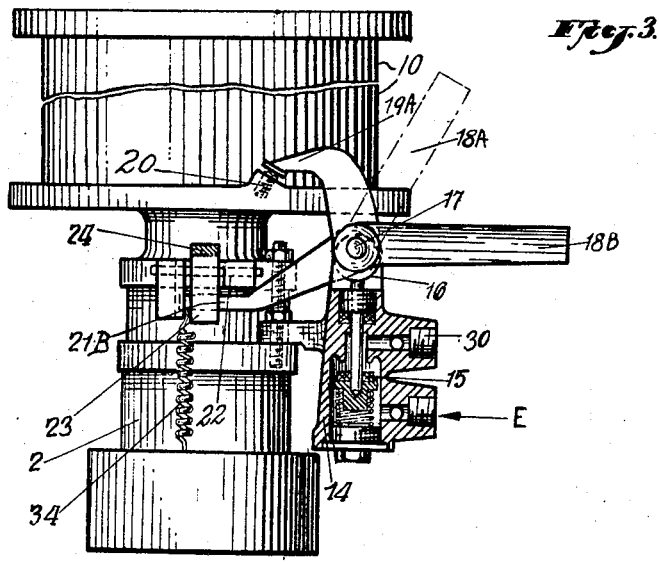
Fig. 3 is a part sectional front view (from the side of the operator) of the apparatus shown in Fig. 1.
Figure 5:
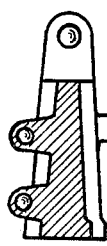
Fig. 5 is a sectional view of the unit shown in Fig. 4, the section being made on line V—V of said figure.

For the sake of clearness only the elements 18 and 19 are shown in Fig. 3 in the other extreme position marked 18A and 19A, the element 21 being shown in section in the corresponding position marked 21A (Fig. 1).

A three arm lever 23, 24, 26 is supported by a shaft 22 extending normal to the shaft 17. The arm 23 is shaped as a hook for hooking the end of arm 21 when it is in the position 21B, the arm 24 being under the action of a return spring 25 connected with the body of the servomotor cylinder 10.

The arm 26 supports an adjustable screw 27 which, through an opening made in cover 9 of the cylinder 7, penetrates into the cylinder 7 for cooperation with the piston 8.

The arm 24 is adapted for auxiliary manipulation of the lever 23, 24, 26.

The upper chamber 28 of the cylinder 10 is connected by a water pipe, not shown, with a port 30 of the valve 15 which has an inlet E.

When the hand lever 18 is in the position 18A the control unit is in the position shown in Figs. 3 and 7 and the chamber 28 communicates with the open valve 15, the cold water entering through E pressing the pistons 11 and 8 downward. The chamber 29 communicates with the valve 31, which is closed, the water flowing therefrom through the open valve 33 and through port S to the outside. When the hand lever 18 is moved to the position 18B against the action of the spring 34 the control unit is in the position shown in Fig. 8 in which water flows from the chamber 28 through the top of the now closed valve 15, through the open valve 32 and through the top of the closed valve 33 to the outside. Cold water also flows from E through the closed valve 15 into the open valve 31 and therefrom to the chamber 29, pressing the pistons 11 and 8 upward so that hot water can flow from the boiler into the cylinder 7 below the piston 8 and therefrom penetrate the coffee in the infusion chamber 12. At the time when fresh hot water enters the cylinder 7 cold water passes through all valves of the control unit whereby the unit 14 is well cooled and since it is heat conductingly connected with the bracket 3 and with the cylinder 7 these parts are also cooled, preventing overheating of the percolator. During the time the pistons 11 and 8 move downward pressing a charge of hot water through the infusion chamber 12 cold water flows through the valves 15, 31 and 33, producing a somewhat reduced cooling effect.

The device therefore, operates as follows:

When the boiler 1 is in working condition (temperature T°) the set 2 has a constant working temperature $t°$.

The hand lever 18 is in position 18A and arm 21 is in the position 21A (Fig. 1), i. e., is unhooked, and the valves 15, 31, 32, 33 are in the positions according to Fig. 7.

Overcoming the resistance of the spring 34 the hand lever 18 can be rotated clockwise to the position 18B; arm 21 is thus hooked on the hook 23 of the lever 23, 24, 26 (position 21B).

The valves of the unit now assume the positions shown in Fig. 8 and the lower chamber 29 of the servomotor cylinder 10 is in communication with the cold water inlet E. The upper chamber 28 communicates with the outlet S.

The piston 11 rises, pulling up the piston 8 and uncovering opening 6.

The hot water, arriving from the boiler, floods the infusion chamber.

In proximity of its upper position, piston 8 knocks against screw 27, counterclockwise swinging lever 23, 24, 26, causing unhooking of arm 21.

The shaft 17, under the action of the return spring 34, returns to the starting position, while the valves of the unit 14 assume the position shown in Fig. 7 and lever 18 moves to position 18B.

Under the impulse of the hydraulic pressure operating on the upper face of piston 11, the latter, together with the piston 8 descends, pressing out the drink from the coffee powder panel.

The pressure of the cold water fed into the inlet E is preferably lowered by a pressure reducer, not shown, so that the pressure acting on the coffee powder is primarily controlled by the difference of the diameters of the pistons 11 and 8. To make the effect of the hydraulic servomotor piston 11 substantially independent of the varying pressures in the water main to which the inlet E is connected, the diameter of the piston 11 is at least twice that of the piston 8.

The aforedescribed operating cycle may be repeated as many times as desired.

The successive drink preparations may follow any rhythm, quick or slow, which never and in no case will change the three temperatures T° (boiler), $t°$ (set), Z° (infusion-water), which are the presuppositions to obtain a good coffee.

Long experience has shown that coffee percolators according to the invention operate perfectly.

One obtains at any operating rhythm a coffee with a very nice, thick, lasting foam of a yellow-gold color, of an irreproachable taste and fragrance which never has a "burnt" taste.

The valve distributor, controlled by a cam shaft, solves with full satisfaction the secondary problem of using, in an automatic set, a water source of a low pressure for operating the servomotor, in combination with the prevention of overheating of the set.

What is claimed is:

1. A coffee making apparatus including a hot water boiler, a bracket connected thereto, and a coffee percolator supported by said bracket and comprising an infusion chamber, a first cylinder above said chamber, a port in said cylinder, conduit means connecting said port with said boiler for conducting hot water into said cylinder, a first piston reciprocable in said cylinder for controlling said port and pressing hot water into said infusion chamber upon down-stroke of said piston, a hydraulic servomotor including a second cylinder placed above said first cylinder, a second piston reciprocable in said second cylinder and connected with said first piston for actuating the latter, means connected with said second cylinder for selectively conducting cold water into and out of the spaces in said second cylinder above and below said second piston for actuating said second piston, said last mentioned means including a cold water flow control unit which is placed laterally of and heat conductingly connected with said first cylinder for cooling the latter.

2. A coffee making apparatus as defined in claim 1 in which the diameter of the second piston is at least twice as great as the diameter of said first piston.

3. A coffee making apparatus as defined in claim 1 in which said control unit includes a plurality of valves, and a cam shaft having a plurality of cams individually operatively connected with said valves for actuating the latter upon rotation of said cam shaft.

4. A coffee making machine according to claim 3, including a spring operatively connected with said cam shaft and with said percolator for rotating said cam shaft in one direction, an arm connected with said cam shaft, an abutment on a stationary part of the percolator adapted to be abutted by said arm to limit rotation of said cam shaft by the action of said spring, and a handle connected with said cam shaft for rotating the latter against the action of said spring.

5. A coffee making machine according to claim 4, including a lever pivoted to said first cylinder and having a hook, a crank on said cam shaft and being adapted to be engaged by said hook for holding said cam shaft in the position in which said spring is tensioned.

6. A coffee making machine according to claim 5 in which said lever is provided with an extension adapted to be abutted by said first piston when the latter is in uppermost position for disengaging said crank.

7. A coffee making machine according to claim 6 in which said extension includes an adjustment screw adapted to be abutted by said first piston for adjusting the position of said first piston in which said crank is disengaged.

References Cited in the file of this patent

FOREIGN PATENTS

| 293,551 | Great Britain | July 12, 1928 |
| 477,276 | Italy | Jan. 16, 1953 |